United States Patent
Schwarting

(10) Patent No.: US 9,689,076 B2
(45) Date of Patent: Jun. 27, 2017

(54) METHOD OF CLEANING TURBINE BLADES

(71) Applicant: Airbus DS GmbH, Taufkirchen (DE)

(72) Inventor: Walter Schwarting, Oldenburg (DE)

(73) Assignee: Airbus DS GmbH, Taufkirchen (DE)

( * ) Notice: Subject to any disclaimer, the term of this patent is extended or adjusted under 35 U.S.C. 154(b) by 204 days.

(21) Appl. No.: 14/511,749

(22) Filed: Oct. 10, 2014

(65) Prior Publication Data
US 2016/0101446 A1 Apr. 14, 2016

(51) Int. Cl.
*B23P 6/00* (2006.01)
*C23G 5/00* (2006.01)
*F01D 5/00* (2006.01)

(52) U.S. Cl.
CPC .............. *C23G 5/00* (2013.01); *B23P 6/002* (2013.01); *F01D 5/005* (2013.01)

(58) Field of Classification Search
CPC .......... B23P 6/002; F01D 5/005; F01D 5/046; B08B 7/0071; B08B 7/04; B08B 5/00
See application file for complete search history.

(56) References Cited

U.S. PATENT DOCUMENTS

| | | | | |
|---|---|---|---|---|
| 4,781,358 A * | 11/1988 | Langan | ...................... | B22F 3/10 266/80 |
| 5,858,058 A * | 1/1999 | Kern | .................. | C21B 13/0073 266/156 |
| 6,103,386 A * | 8/2000 | Raybould | ............... | C23C 28/00 428/469 |
| 6,199,276 B1 | 3/2001 | Siebert et al. | | |
| 7,361,233 B2 * | 4/2008 | Budinger | .............. | B08B 7/0071 134/19 |
| 2002/0029630 A1* | 3/2002 | Blumenthal | .............. | F27B 5/04 73/232 |
| 2005/0035085 A1 | 2/2005 | Stowell et al. | | |
| 2005/0223995 A1* | 10/2005 | Sauer | .................... | C23C 14/564 118/726 |
| 2009/0223538 A1 | 9/2009 | Krueger et al. | | |
| 2010/0025262 A1* | 2/2010 | Jabado | ...................... | B08B 3/12 205/771 |
| 2010/0175724 A1 | 7/2010 | Lutterman et al. | | |
| 2010/0218787 A1 | 9/2010 | Ladru et al. | | |

FOREIGN PATENT DOCUMENTS

| | | |
|---|---|---|
| CA | 2 685 800 | 11/2010 |
| DE | 600 15 251 | 2/2006 |
| DE | 102005032685 | 1/2007 |
| DE | 102013009843 | 12/2014 |
| EP | 2 192 209 | 6/2010 |
| WO | WO 2006/061338 | 6/2006 |
| WO | WO 2009/049637 | 4/2009 |

\* cited by examiner

*Primary Examiner* — Michael Kornakov
*Assistant Examiner* — Natasha Campbell
(74) *Attorney, Agent, or Firm* — W. F. Fasse

(57) ABSTRACT

In a process for cleaning contaminating silicon dioxide $SiO_2$ off of turbine blades, silicon dioxide that is on the turbine blades is reduced selectively in a vacuum process that takes place in dry conditions and at elevated temperature inside a high vacuum furnace, by feeding gas having a reducing action, consisting of hydrogen gas or carbon monoxide, is introduced into the high vacuum furnace. The temperature inside the high vacuum furnace is at least about 1000 degrees Celsius, and the residence time of the turbine blades in the high vacuum furnace is determined with reference to the diminishment of the SiO concentration, as analyzed with a mass spectrometer. The electrically heatable high vacuum furnace is evacuable by means of a vacuum system that consists of a backing pump and a turbomolecular pump with an adjustable throttle valve and a water-cooled baffle. Further, the gas with reducing action is fed into the furnace via a precision high vacuum regulating valve, and it is equipped with a mass spectrometer.

10 Claims, 3 Drawing Sheets

METHOD OF CLEANING TURBINE BLADES

FIELD OF THE INVENTION

The invention relates to a process for cleaning silicon dioxide, $SiO_2$, off of turbine blades, the process being carried out in a dry vacuum process that takes place at elevated temperature inside a high vacuum furnace, and in which at least some of the silicon dioxide on the turbine blades that are to be cleaned is removed by means of a gas with reducing action. The invention further relates to a device for carrying out such a process.

BACKGROUND INFORMATION

When jet aircraft fly through clouds of volcanic ash, quantities of particles infiltrate their engines, wherein the dust particles that are carried by the wind consist essentially of silicon dioxide, $SiO_2$. Despite the rise in temperature of the combustion air, these particles do not cause a burden in the area of the air intake—the fan—or of the subsequent compression, that is to say in the compressor, but the turbine that is driven by the combustion gases experiences significant thermal loading in its typical temperature interval up to 2200° C. from melting silicon dioxide particles.

The basic materials from which turbine blades are made are typically special alloys on a basis of chromium and nickel that are particularly suitable for high temperature applications, and are cooled by an internal cooling system and/or external film cooling. However, the base material of the turbine blades is protected essentially by the fact that a thin ceramic surface coating having very low thermal conductivity and based on zirconium dioxide, $ZrO_2$, with an addition of vanadium oxide, $V_2O_5$, is applied with a coating thickness of about 0.2 mm. This columnar insulating ceramic coating literally sucks itself full of the silicon dioxide present in the form of molten droplets. However, the $SiO_2$ filling or saturation that is created thereby in the ceramic coating largely negates the very important thermal insulation effect of the $ZrO_2/V_2O_5$ columns. The increased thermal load on the base material is associated with a significant risk of failure for the turbine blades, consequently for the engine and ultimately for the aircraft itself. Turbine blades that are contaminated in this way become unusable and a new coating must be applied to them. In the processes currently known, this involves completely removing the existing coating in a pickling process, and then again constructing a ceramic coating layer to replace the one that has been removed on top of the base material.

Accordingly, a process of the kind described in the introduction was disclosed in DE 600 15 251 T2, in which in a radical pickling process a dense ceramic coating in the form of a thermal barrier coating (TBC) is removed from the surface of an object containing at least one representative of the group Al, Ti, Cr, Zr and oxides thereof as a gas-phase compound by total removal of the coating on the surface of the object, and the coating is then reconstructed on the base material. In this known process, a hydrogen gas enriched with hydrogen fluoride is used as the reduction gas. In the other processes known from WO 2009/049637 A1, WO 2006/061338 A1 and DE 10 2005 032 685 B4 as well, the coating is stripped completely in this way, and the removed oxide layer is then built up on the base material again, and process gases enriched with halogen ions are used in all these known processes.

SUMMARY OF THE INVENTION

The object underlying at least one embodiment of the invention is to design a process of the kind described in the introduction in such manner that it is possible to remove the silicon dioxide pad or filling from the $ZrO_2/V_2O_5$ coating gently, so that only the extraneous, contaminating silicon dioxide is removed and thus to regenerate the turbine blades. A further object of the invention is to provide a device for carrying out a process of such kind.

The invention solves the first object with a process of the kind described in the introduction, in which the silicon dioxide $SiO_2$ to be removed is reduced selectively to the silicon monoxide stage SiO by the gas with reductive action consisting of hydrogen gas $H_2$ or carbon monoxide CO, which contains a minimum quantity of $H_2O$ or $CO_2$ respectively, is then vaporised in a vacuum and then pumped out in gas form, wherein the residence time of the turbine blades in the high vacuum furnace is selected until the time when the SiO concentration falls significantly. The state of the ceramic $ZrO_2/V_2O_5$ coating is not affected thereby.

The invention offers the advantage of regenerating turbine blades rather than complete replacement or treatment by removing the coating and then applying a new coating. It makes use of the fact that instead of the known 'wet' chemical reduction processes it is also possible to reduce the metal oxides with a chemical reaction that is 'dry'. This can be carried out in two ways, either by thermal decomposition of the metal oxides at a sufficiently high temperature and with very low oxygen partial pressures, which are lower than the conditions for reduction-oxidation (REDOX) balance, or, as is envisaged by the solution according to the invention, with the aid of a reducing atmosphere consisting of $H_2$ or CO at high temperature and with product components of oxidants such as water, H2O, or carbon dioxide, CO2, that are low and thus also fall below the conditions for REDOX balance.

The solution for the second object is realised with a device that comprises a high vacuum furnace, a vacuum system and a gas inlet system, and that is adapted to perform the process according to the invention.

BRIEF DESCRIPTION OF THE DRAWINGS

In the following, the invention will be explained in greater detail with reference to an embodiment thereof illustrated in the drawing. In the drawing.

DETAILED DESCRIPTION OF EXAMPLE EMBODIMENTS OF THE INVENTION

Figure 1:
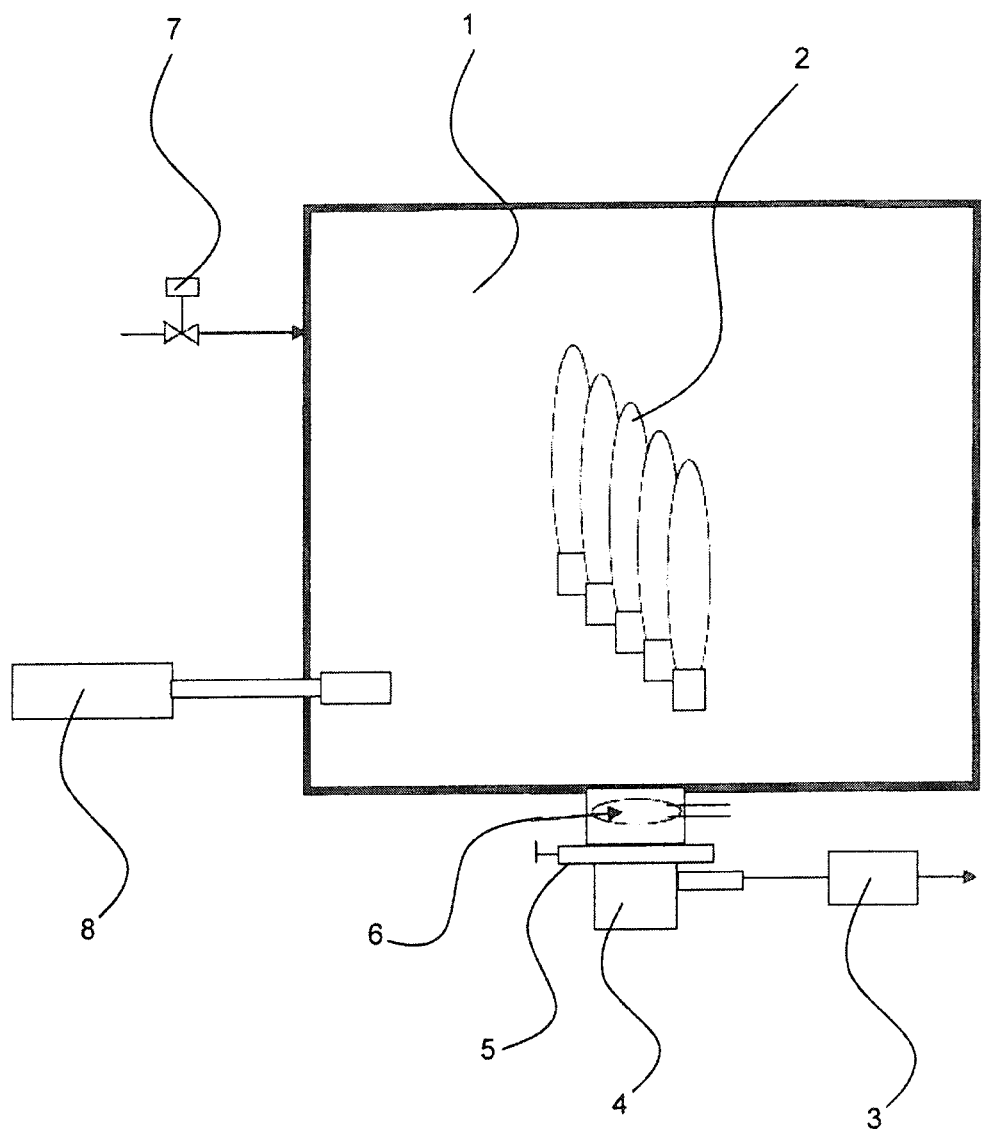
FIG. 1 is a schematic representation of an arrangement for cleaning turbine blades.

The arrangement illustrated in FIG. 1 for cleaning turbine blades comprises an electrically heated high vacuum furnace 1, in which a series of turbine blades 2 is disposed for cleaning. High vacuum furnace 1 is evacuable via a vacuum system that consists of a backing pump 3 and a turbomolecular pump 4 with an adjustable throttle valve 5 and a water-cooled baffle 6. The furnace 1 is also equipped with a gas inlet valve 7 for the hydrogen gas H2 and a mass spectrometer 8.

In this high vacuum furnace 1, the silicon dioxide located on the turbine blades 2 that are to be cleaned is reduced selectively at elevated temperature. The term "selectively" in this context means that of the oxides involved, SiO2, $ZrO2$ and $V2O5$, only the $SiO2$ is reduced to the volatile product SiO, silicon monoxide, in the vacuum. The process by which a metal oxide is reduced is determined both energetically and by the position of the chemical balance depending on the quantities of the materials involved. On the one hand, the chemical reduction of the oxide must be activated, but at the same time an undesirable back reaction, i.e., oxidation of the reduction product, must be prevented.

In the case of turbine blades 2 contaminated with $SiO2$, three metal oxides are present side by side on the base material, which is a nickel-based superalloy: the $ZrO2$ with an additive of $V2O5$ as a ceramic insulation layer and the $SiO2$ of the volcanic ash. However, only the $SiO2$ is to be reduced, and even that is not to be completely reduced to elemental silicon, but only partially, until it reaches the state of silicon monoxide, SiO, that is only stable in the gas phase, and is thus volatile.

Figure 2:
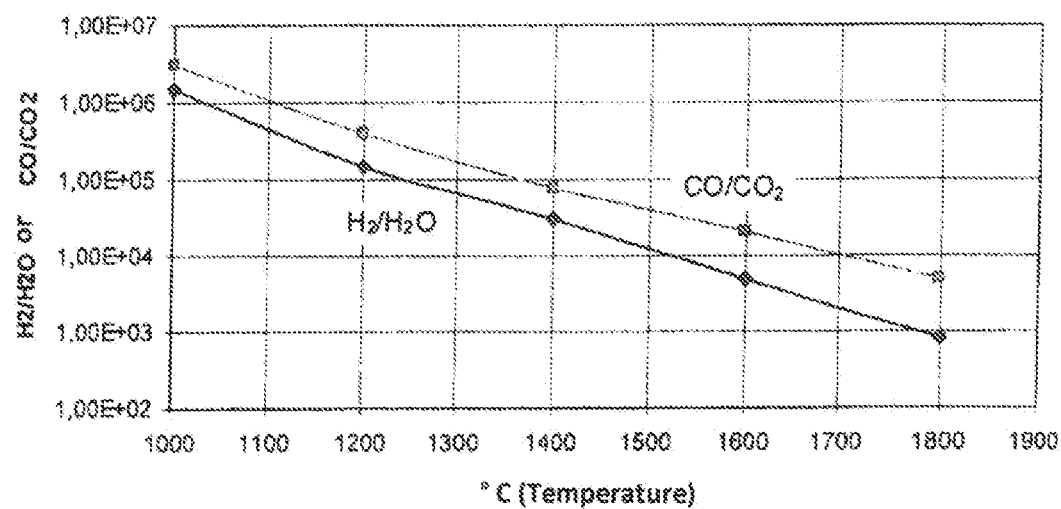
FIG. 2 is a diagram in which the reduction-oxidation (REDOX) balances of the H2/H2O and CO/CO2 systems are illustrated.

The process uses the capabilities of selective reduction either by hydrogen $H2$, with a low but controlled enrichment of water, $H2O$, in the absence of carbon dioxide, $CO2$, or alternatively by carbon monoxide, CO, with a controlled enrichment of carbon dioxide, $CO2$, in the absence of water, $H2O$. By this method, the undesirable reduction of the thermally insulating ceramic coating is prevented. In FIG. 2, the reduction balance of the $H2/H2O$ and the $CO/CO2$ systems is represented in a diagram, wherein the upper line indicates the REDOX balance of the $CO/CO2$ system and the lower line indicates the REDOX balance of the $H2/H2O$ system.

In the example of $SiO2$ reduction with hydrogen, a reducing gas, in the case of the embodiment shown in the figure this is very pure hydrogen is fed into high vacuum furnace 1 through gas inlet valve 7 with a controlled, small quantity of impurity in the form of oxidants such as oxygen, $O2$, and water, $H2O$. When the furnace temperature is high enough, the chemical reduction of the silicon dioxide, $SiO2$, takes place to yield volatile silicon monoxide, SiO, and product water, $H2O$, according to the following reaction equation:

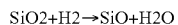

Product water is also formed as a reaction product in addition to the SiO, and both products of the reaction are gas-phase, and therefore volatile, substances.

At the end of the reaction, the reducing gas used in the furnace, then contains increasingly higher concentrations of the products SiO and $H2O$. At a maximum permitted concentration of water in the hydrogen of the high vacuum furnace filling, the $SiO2$ REDOX balance is reached, and the reduction process is stopped because of the back reaction to the oxide. Consequently, this value must not be exceeded. Moreover, the product that is formed, SiO, also has to be removed from the system. This is why the hydrogen gas flow rate must be monitored.

In summary, the reduction of the $SiO2$ is made possible by the specification of an initially large $H2/H2O$ ratio in the hydrogen, but on the other hand, the reduction of the other oxides involved, $ZrO2$ or $V2O5$, is prevented, because the conditions of the respective REDOX balances are not reached. However, since the product water in the hydrogen accumulates over time, and the $H2/H2O$ relation becomes smaller, a certain minimum value of the $H2/H2O$ ratio must be controlled by the continuous addition of hydrogen. This ensures that the $SiO2$ reduction balance condition cannot be exceeded. The added hydrogen is introduced—under constant pressure—at the same rate as the product gas formed is pumped out. The maximum permitted concentration of the products $H_2O$ and SiO is controlled by a dynamic dilution of the furnace atmosphere, and said products are removed from the system at the same time.

Figure 3:
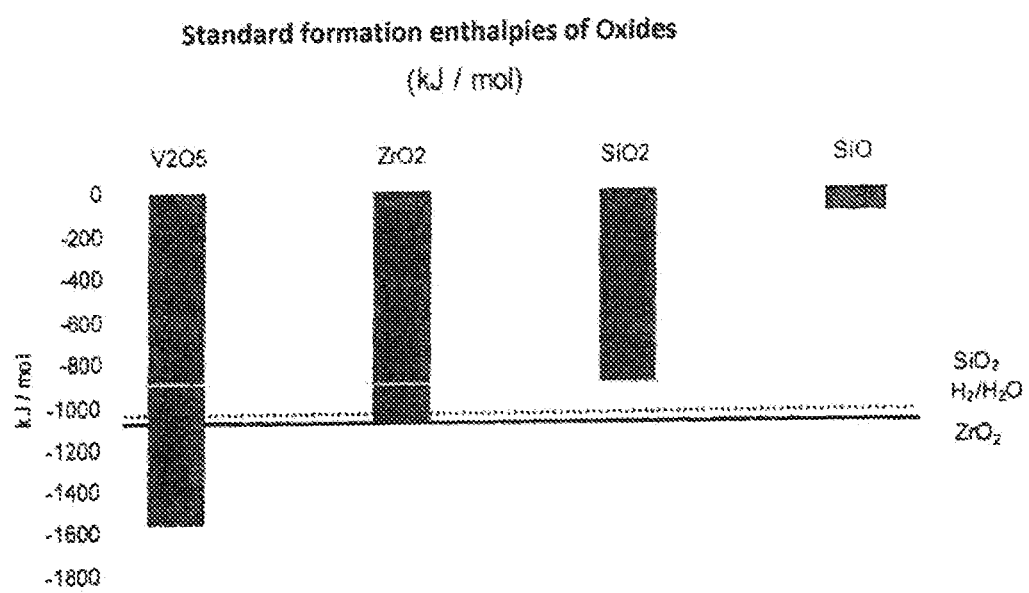
FIG. 3 is a diagram of the standard formation enthalpies of the oxides involved, ZrO5, V2O5, SiO2 and SiO.

The standard formation enthalpies (25° C.; 298 K) of the oxides involved in this process are far enough apart from each other to enable the $SiO2$ to be reduced selectively. The diagram in FIG. 3 shows that silicon dioxide is reduced most readily, whereas $ZrO2$ and $V2O5$ are more stable because they have more markedly negative standard formation enthalpies.

The lowest line in this figure indicates the REDOX balance position of the $ZrO2$, which the $ZrO2$ value must not fall below. The top line indicates the position of REDOX balance of the $SiO2$. The middle, dotted line suggests the optimal position of the $H2/H2O$ ratio. However, the formation enthalpies are temperature-dependent; the values rise, i.e., the figures with a negative sign become smaller.

A certain $H2/H2O$ ratio is assigned to each of the oxides for each balance temperature. As the following table for $SiO2$ shows, its value must not fall below the molar $H2/H2O$ ratio.

Moreover, a relative concentration value of water in hydrogen, expressed in 'vpm', below which the value must not fall, corresponds to the respective $H2/H2O$ ratio.

TABLE 1

| (for SiO2) | | |
|---|---|---|
| ° C. Temperature | H2/H2O Molar ratio | vpm H2O in H2 Concentration |
| 1000 | 1.5E+6 | 9E−1 |
| 1200 | 1.5E+5 | 9E0 |
| 1400 | 3E4 | 6E+1 |
| 1600 | 5E3 | 4E2 |
| 1800 | 9E+2 | 1.5E+3 |

In order to avoid reducing the $ZrO2$, the concentration of water in the hydrogen should not fall below a certain minimum value. The possible residual oxygen content in a hydrogen pressure gas may be converted directly into water stoichiometrically and adjusted to the necessary total water concentration value, which is obtained from the temperature dependency of the reduction according to table 2.

Accordingly, an optimum value for the $H2/H2O$ ratio of the reduction gas generally lies between the illustrated temperature-dependent values of the two tables, but at all events slightly higher than the concentration values (vpm water) of the $ZrO2$ or slightly lower than the values for the molar ratio ($H2/H2O$ ratio) for $ZrO2$.

TABLE 2

| (for ZrO2) | | |
|---|---|---|
| ° C. Temperature | H2/H2O Molar ratio | vpm H2O in H2 Concentration |
| 1000 | 3E9 | 7E−4 |
| 1200 | 8E7 | 2E−2 |
| 1400 | 4E6 | 5E−1 |
| 1600 | 5E5 | 4E0 |
| 1800 | 8E+4 | 2.5E+1 |

Since the quantity of $SiO2$ becomes smaller over time, the quantities of released SiO and product water also become smaller at the same time. In order to capture both, the endpoint of the reduction and the presence of residual $SiO2$, an analytical control is provided, in which the stated substance concentrations of SiO and $H_2O$ in the furnace atmosphere are measured. An instrument-based gas analysis using mass spectrometer 8 in the vacuum furnace is particularly suitable for this. With this, the vacuum may be evaluated for interfering oxygen and water concentrations, e.g., due to leaks or outgassing, in respect of the residual gas composition thereof. The total product gas concentration, H2O, 18 amu, SiO, 44 amu, and Si, 28 amu (amu=atomic mass units) may be tracked while the reaction with hydrogen gas is proceeding, and set to required values by altering either the pressure or the quantity of reduction gas that is introduced.

In the case of the alternative reduction gas, carbon monoxide, CO, the products of reduction that are formed are SiO and CO2. The mass of the CO2 is 44 amu, which is the same value as that of SiO, so a total value of the two superimposed mass peak intensities is mapped so that the intensity of the mass 44 amu is reduced correspondingly sharply as the quantity of SiO2 falls towards the end of the reduction.

The following balance values apply for reduction with CO:

TABLE 3

(for SiO2)

| ° C. Temperature | C2/CO2 Molar ratio |
|---|---|
| 1000 | 3E6 |
| 1200 | 3.5E5 |
| 1400 | 7.5E4 |
| 1600 | 2.5E4 |
| 1800 | 5E3 |

TABLE 4

(for ZrO2)

| ° C. Temperature | C2/CO2 Molar ratio |
|---|---|
| 1000 | 3.5E9 |
| 1200 | 1E8 |
| 1400 | 9E6 |
| 1600 | 2.5E6 |
| 1800 | 1.5E3 |

An important consideration in the context of this process is that high vacuum furnace 1 has a precision high vacuum regulating valve as the gas inlet valve 7 so that the reduction gas inlet rate can be regulated. At the same time, the composition of the furnace atmosphere is monitored with mass spectrometer 8. The water-cooled adoption plate or baffle 6 is then located upstream of the reducing valve 5, which serves to throttle the suction power of a turbomolecular pump 4, in order to prevent silicon monoxide from being precipitated cold at this stage, and so prevent the rotor and stator blades of the turbomolecular pump 4 from becoming coated.

In a process for cleaning contaminating silicon dioxide SiO2 off of turbine blades, the silicon dioxide that is on the turbine blades to be cleaned is selectively reduced at elevated temperature in a vacuum process that proceeds in dry conditions and takes place in a high vacuum furnace, by introducing a gas with reducing action and consisting of hydrogen gas or carbon monoxide into the high vacuum furnace. The temperature in the high vacuum furnace is at least about 1000 degrees Celsius, and the residence time of the turbine blades in the high vacuum furnace is determined with reference to the diminishment of the SiO concentration, as analysed with a mass spectrometer. The electrically heatable high vacuum furnace is evacuable by means of a vacuum system that consists of a backing pump and a turbomolecular pump with an adjustable throttle valve and a water-cooled baffle. Further, the gas with reducing action may be fed thereto via a precision high vacuum regulating valve, and it is equipped with a mass spectrometer.

The invention claimed is:

1. Process for cleaning contaminating silicon dioxide off of turbine blades, said process being carried out in a dry vacuum process that takes place at elevated temperature inside a high vacuum furnace, and in which at least some of the silicon dioxide on the turbine blades is removed by a gas with reductive action, characterised in that the silicon dioxide to be removed is reduced selectively to silicon monoxide in a reduction reaction by the gas with reductive action, which consists of hydrogen gas or carbon monoxide respectively containing a quantity of $H_2O$ or $CO_2$ below a quantity necessary for a redox balance of the silicon dioxide, is vaporised in a vacuum, and is pumped out in gas form, wherein a residence time of the turbine blades in the high vacuum furnace is selected to be until the time when a SiO concentration of the silicon monoxide is reduced correspondingly as a quantity of the silicon dioxide falls toward an end of the reduction reaction.

2. Process according to claim 1, characterised in that the gas with reductive action consists of the hydrogen gas containing the quantity of $H_2O$ and is monitored for a maximum permitted concentration value of reaction products by checking a gas flow rate by mass spectrometer analysis.

3. Process according to claim 1, characterised in that the gas with reductive action consists of the carbon monoxide containing the quantity of $CO_2$ and is monitored for a maximum permitted concentration value of reaction products by checking a gas flow rate by mass spectrometer analysis.

4. Process according to claim 1, characterised in that the temperature in the high vacuum furnace is at least 1000 degrees Celsius.

5. Device for performing the process according to claim 1, comprising a high vacuum furnace, in which the turbine blades to be cleaned may be placed, and which is evacuable via a vacuum system, and into which the gas with reductive action can be introduced via a gas inlet system.

6. Device according to claim 5, characterised in that the vacuum system consists of a backing pump and a turbomolecular pump with an adjustable throttle valve and a water-cooled baffle.

7. Device according to claim 5, characterised in that the gas inlet system consists of a precision high vacuum regulating valve.

8. Device according to claim 5, characterised in that the high vacuum furnace is equipped with a mass spectrometer.

9. Device according to claim 5, characterised in that the high vacuum furnace can be heated electrically.

10. Process according to claim 1,
wherein the turbine blades each comprise a base material and a ceramic coating on the base material,
wherein the silicon dioxide is on, and in voids of, the ceramic coating, and
wherein, due to the selected residence time and the quantity of $H_2O$ or $CO_2$, the at least some of the silicon dioxide is removed from the ceramic coating without removing and without damaging the ceramic coating.

* * * * *